(12) United States Patent
Gettner et al.

(10) Patent No.: US 8,447,464 B2
(45) Date of Patent: May 21, 2013

(54) SYSTEM AND METHOD FOR INTERFACING BETWEEN AN ON-BOARD DIAGNOSTIC OUTPUT AND A DISTANCE MEASURING INSTRUMENT INPUT

(75) Inventors: Don Gettner, Tampa, FL (US); Bernard Timothy, Huntsville (CA); Val Gretchev, Whitby (CA); Boris Gretchev, Uxbridge (CA)

(73) Assignee: North-Line Canada Ltd., Huntsville (CA)

( * ) Notice: Subject to any disclaimer, the term of this patent is extended or adjusted under 35 U.S.C. 154(b) by 1031 days.

(21) Appl. No.: 12/222,033

(22) Filed: Jul. 31, 2008

(65) Prior Publication Data

US 2009/0043444 A1 Feb. 12, 2009

Related U.S. Application Data

(60) Provisional application No. 60/935,245, filed on Aug. 2, 2007.

(51) Int. Cl.
*G06F 3/00* (2006.01)

(52) U.S. Cl.
USPC .......................................... 701/32.5; 701/468

(58) Field of Classification Search
USPC ............................ 701/29, 33, 213, 32.5, 468
See application file for complete search history.

(56) References Cited

U.S. PATENT DOCUMENTS

| | | | | |
|---|---|---|---|---|
| 5,077,701 A | * | 12/1991 | Lill | 367/98 |
| 5,095,452 A | * | 3/1992 | Kanemaru | 702/165 |
| 5,941,931 A | * | 8/1999 | Ricks | 701/207 |
| 6,009,363 A | * | 12/1999 | Beckert et al. | 701/33 |
| 6,333,711 B1 | * | 12/2001 | Suyama | 342/357.31 |
| 6,871,121 B2 | | 3/2005 | Tomson | |
| 7,363,129 B1 | * | 4/2008 | Barnicle et al. | 701/29 |
| 2002/0105460 A1 | * | 8/2002 | Sladen | 342/357.14 |
| 2004/0215379 A1 | | 10/2004 | Pangerl et al. | |
| 2005/0014536 A1 | * | 1/2005 | Grady | 455/573 |
| 2005/0096809 A1 | | 5/2005 | Skeen et al. | |
| 2005/0146458 A1 | | 7/2005 | Carmichael et al. | |
| 2007/0100529 A1 | | 5/2007 | Blythe et al. | |
| 2009/0073175 A1 | * | 3/2009 | Matsumoto et al. | 345/467 |

FOREIGN PATENT DOCUMENTS

JP 10122878 A * 5/1998

OTHER PUBLICATIONS

Aris et al., Development of OBD-II Driver Information System, Mar. 10-14, 2007, International Engineering Convention, Jeddah, Saudi Arabia.*
Machine Translation of JP 10-122878, May 15, 1998.*
Vaisala TCI200 Vehicle Distance Translator Users Guide, Date Unknown.*
Jamar Technologies, Inc.; Brochure; Apr. 2005.

* cited by examiner

Primary Examiner — Darnell Jayne
Assistant Examiner — Sasha T Varghese

(57) ABSTRACT

A method and system for interfacing and communicating between an in-vehicle device such as an on board diagnostic (OBD) system and an existing distance measurement instrument (DMI) are provided. In one embodiment, the interface sends a plurality of vehicle speed requests to the OBD system to obtain a plurality of vehicle speed measurements, uses the plurality of vehicle speed measurements and time stamps associated therewith to compute a distance travelled during a time interval, converts the distance travelled to a series of pulses, and sends the series of pulses to the DMI.

22 Claims, 13 Drawing Sheets

OLD MESSAGE

60

CAN OBD MESSAGE

60a

FIFO

SYSTEM AND METHOD FOR INTERFACING BETWEEN AN ON-BOARD DIAGNOSTIC OUTPUT AND A DISTANCE MEASURING INSTRUMENT INPUT

This application claims priority from U.S. Provisional Application No. 60/935,245 filed on Aug. 2, 2007, the contents of which are incorporated herein by reference.

TECHNICAL FIELD

The following relates generally to in-vehicle data acquisition and has particular utility in interfacing between in-vehicle devices, such as an on-board diagnostic system, and a distance measuring instrument.

BACKGROUND

In the traffic planning and highway management industry, the precise speed and distance of a vehicle is often required while the vehicle is being driven. In order to measure these parameters, a transmission sensor is tapped into the vehicle speed sensor (VSS) signal, and the transmission sensor sends the data to a distance measuring instrument (DMI), which displays and/or records into memory, the precise vehicle speed and distance travelled. An example in-vehicle commercially available DMI is a RAC Plus™ series instrument manufactured by JAMAR Technologies, Inc.™.

Every year, many DMI units are sold and each requires a sensor kit to be installed in each vehicle in which the DMI is to be used. The sensor kit provides an interface to tap into the VSS signal, which is generated in all vehicles and used in various sub-systems in the vehicle, including the speedometer. The location and colour coding for the cable that carries the VSS signal can vary for each make and model of vehicle. As a result, customers typically are required to specify in what vehicle(s) they are planning to use the DMI, in order to enable the vendor to look up the location of the cable and choose the appropriate sensor kit and instructions to enable the customer to install the sensor. The actual installation of the sensor kit is then required, for which the customer is responsible. Often the location of the cable carrying the VSS signal is under the hood, in the dash, or in an otherwise hard to reach area of the vehicle including underneath the vehicle and along the transmission. Once the sensor has been installed and a separate power cable is connected, the DMI can be plugged into the cable running from the sensor and used by the customer.

The VSS signal comprises a sequence of pulses that are generated by a VSS module. Each pulse equals a fixed distance that the vehicle has travelled. The sensor obtains the VSS signal, amplifies it, and then sends the amplified signal to the DMI as a series of pulses. The DMI may then count the pulses coming from the sensor and from that data, calculates the distance travelled. For example, if every pulse represents 1,000 feet, then 1000 pulses would equal 1000 feet. However, typically, the pulses do not necessarily represent a known distance and thus the DMI needs to be calibrated in such cases after installing the transmission sensor. This involves driving a known distance (e.g. 1000 feet) in a calibration mode of the DMI. The DMI then counts the number of pulses and then calculates a calibration factor that is used to convert from pulses to distance thereafter.

There are several difficulties and drawbacks associated with existing sensor kits used with the DMI units. For instance, the sensor kit can be difficult to install. On some vehicles, a lift may be required to access the cable carrying the VSS signal. Also, in most cases, the wire that taps into the VSS-wire needs to be routed through the firewall of the vehicle so that it can be accessed from within the cab of the vehicle where the DMI is typically located and the wiring can be prone to corrosion if under the hood. This also often requires drilling holes through the firewall, which adds to the time and complexity of the installation process. Moreover, if the installation of the transmission sensor is done incorrectly, this can interfere with the operation of the ABS braking systems in a vehicle, which in turn can create a dangerous hazard.

The VSS signal is also a low voltage signal. As such, the wire that runs from the 'tap-in' point into the cab is susceptible to electromagnetic interference (EMI) if the wiring is not installed carefully. This noise can affect the accuracy of the data in subtle ways. In some cases, the user may not ascertain that a problem exists until many measurements over a great deal of time have been taken. This can then put previous recordings into doubt. Also, in order to even use the DMI, the desired vehicle that is to be used must have the sensor kit already installed. If it is not, the DMI cannot be used in that vehicle or others.

Given that newer automotive systems are becoming more and more complex, it is becoming more and more difficult to find a specific cable that carries only the VSS signal. In new automotive systems, fewer wires are used, sub-modules in the vehicle communicate with each other over buses, and signals are multiplexed akin to computers in a network. This makes it harder to tap the system for a specific signal. Current DMI units cannot be used with such automotive systems since the transmission sensor is unable to consistently tap into the desired signal. Additionally, the sensor and the DMI unit require a separate power feed (often coming from the battery) and the sensor must be calibrated before being used with the DMI. If changes are to be made to the vehicle (such as changing the tires), then the sensor must also be re-calibrated.

These requirements make the DMI units compatible with only those vehicles having a sensor installed therein and make them susceptible to changes in the operation of the vehicle and the vehicle type.

SUMMARY OF THE INVENTION

In one aspect there is provided a method for interfacing between an in-vehicle system and an existing distance measurement instrument (DMI) to provide distance measurements to the DMI, the method comprising: communicating with the in-vehicle system to obtain data from which a distance that the vehicle has travelled can be ascertained; using the data to determine the distance; converting the distance to a series of pulses in a form familiar to the DMI; and providing the series of pulses to the DMI.

In another aspect, there is provided a computer readable medium comprising computer executable instructions for performing the method using a processor.

In yet another aspect, there is provided an interface device for interfacing between an in-vehicle system and an existing DMI to provide distance measurements to the DMI; the device comprising a first connection compatible with a connector for the in-vehicle system; a second connection compatible with the existing DMI; and a processor between the first and second connections, the processor being configured for: communicating with the in-vehicle system using the first connection to obtain data from which a distance that the vehicle has travelled can be ascertained; using the data to determine the distance; converting the distance to a series of pulses in a form familiar to the DMI; and providing the series of pulses to the DMI using the second connection.

BRIEF DESCRIPTION OF THE DRAWINGS

An embodiment of the invention will now be described by way of example only with reference to the appended drawings wherein.

DETAILED DESCRIPTION OF THE DRAWINGS

It has been recognized that existing DMI units could be more adaptable to complex automotive systems and could be used in any modern vehicle by providing an interface between a device that provides information from which the distance that the vehicle has travelled can be ascertained, such as a speed signal provided by a vehicle's on board diagnostic (OBD) connector, and the existing DMI. By obtaining such information pertaining to the speed of the vehicle, the system described below can process the information such that it is in a form that is familiar and compatible with the DMI unit thus eliminating the need to interface with a VSS signal. As can be appreciated from the below, although certain examples for obtaining information from which distance can be measured are described, the principles described are applicable to any configuration wherein information from which distance can be obtained (e.g. distance directly or by computing distance from other information such as speed), processed and provided to the DMI.

Turning to a first example utilizing information obtained from an OBD connector, it is understood that the OBD connector is a standard connector accessible without any tools near the driver's seat that connects to the OBD system in the vehicle. These connectors have been standardized since 1996 in the SAE J1962 standard having the pinout (16 pins) shown in FIG. 1. However, it has been recognized that existing transmission sensors are not suitable for tapping into the OBD connector, let alone able to communicate with and understand the various protocols used by different vehicle manufacturers. The system described below enables an existing DMI to be used in any OBD-fitted vehicle by interfacing with the OBD connector and translating the signals output thereby to a format that can be interpreted by the existing DMI unit.

Figure 1:
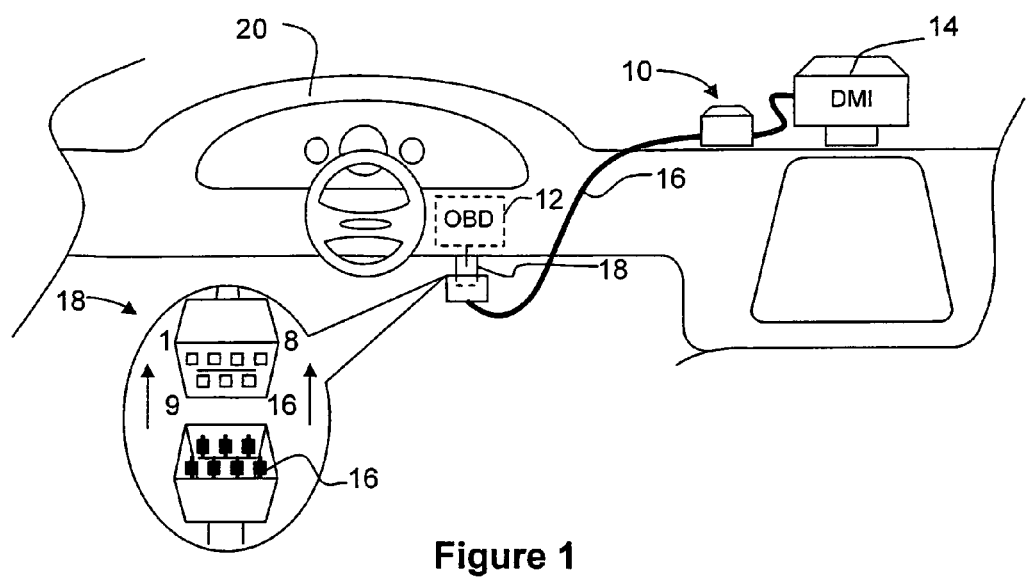
FIG. 1 is a schematic illustration of a portion of a vehicle having a distance measurement instrument (DMI) connected to an on board diagnostic (OBD) system via an interface device.

Referring now to FIG. 1, an interface device 10 is shown for interfacing between an in-vehicle OBD system 12 and an existing DMI unit 14 using a cable connection 16 to an OBD connector 18 mounted on the driver's side of a vehicle 20. As can be seen in FIG. 1, the OBD connector 18 includes the standard 16 pins that are specified in the SAE J1962 standard. The connection 16 includes a commercially available male connector that is configured and sized to appropriately connect to the vehicle's OBD connector 18.

Figure 2:
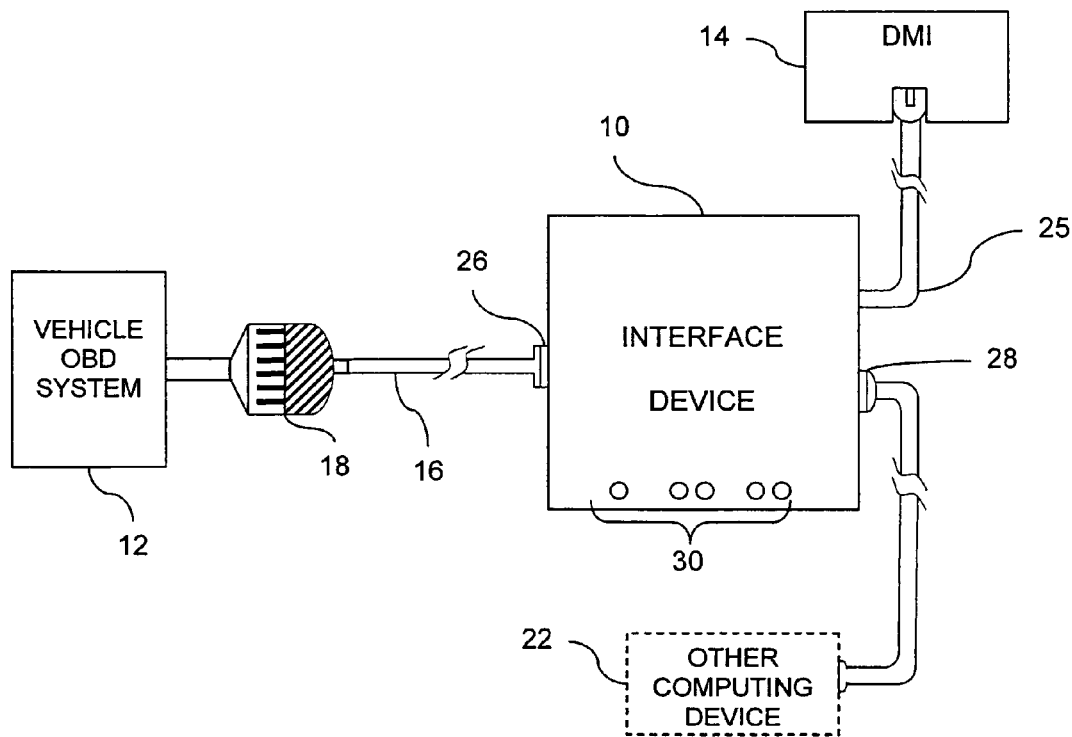
FIG. 2 is a schematic diagram of the connections between the interface device and the DMI, OBD and other external computing devices.

FIG. 2 schematically illustrates the connections between the interface device 10 and the OBD system 12 and the DMI 14. The device-to-OBD connection 16 at the interface device end includes in one embodiment, an external DB-9M RS232 connection 26 but may instead be hardwired into the internal circuitry of the device 10. The device-to-DMI connection includes an RJ-11 socket connection 25, which is the connector used in existing DMIs 14. It will be appreciated that other connections can be used as/if the standard connections to the DMI 14 change. It can also be seen in FIG. 2 that the interface device 10 may optionally provide an additional connection 28 for communicating with an external computing device 22 such as a laptop or other personal computer (PC), personal digital assistant (PDA) or other mobile device, etc. The connection 28 can be any standard connection such as an RJ-45 connection, an RS232 connection, USB, etc. or may even be provided with a wireless connection. The connection 28 may be external as shown or may be internally housed within the interface device 10 (i.e. accessible by opening the housing of the interface device 10). Similarly, the DMI connection 24 may include a socket/plug at each end or may be hardwired at the device end with a plug for connecting to the available socket provided by the DMI 14.

The interface device 10 is used to communicate with, and interpret responses, from the OBD system 12; and translate the responses into signals that are familiar to the DMI 14. The interface device 10 also preferably provides the connection 28 in order to enable the device's software to be modified, upgraded, replaced etc. and to enable the user to read, record and save the data that is at the same time being provided to the DMI 14. The interface device 10, in this embodiment, is housed in a plastic or metal casing with the appropriate sockets and connectors protruding therefrom. This embodiment also includes a set of external LEDs 30, which are used to notify the user of when certain communications are taking place as will be explained in greater detail below.

Figure 3:
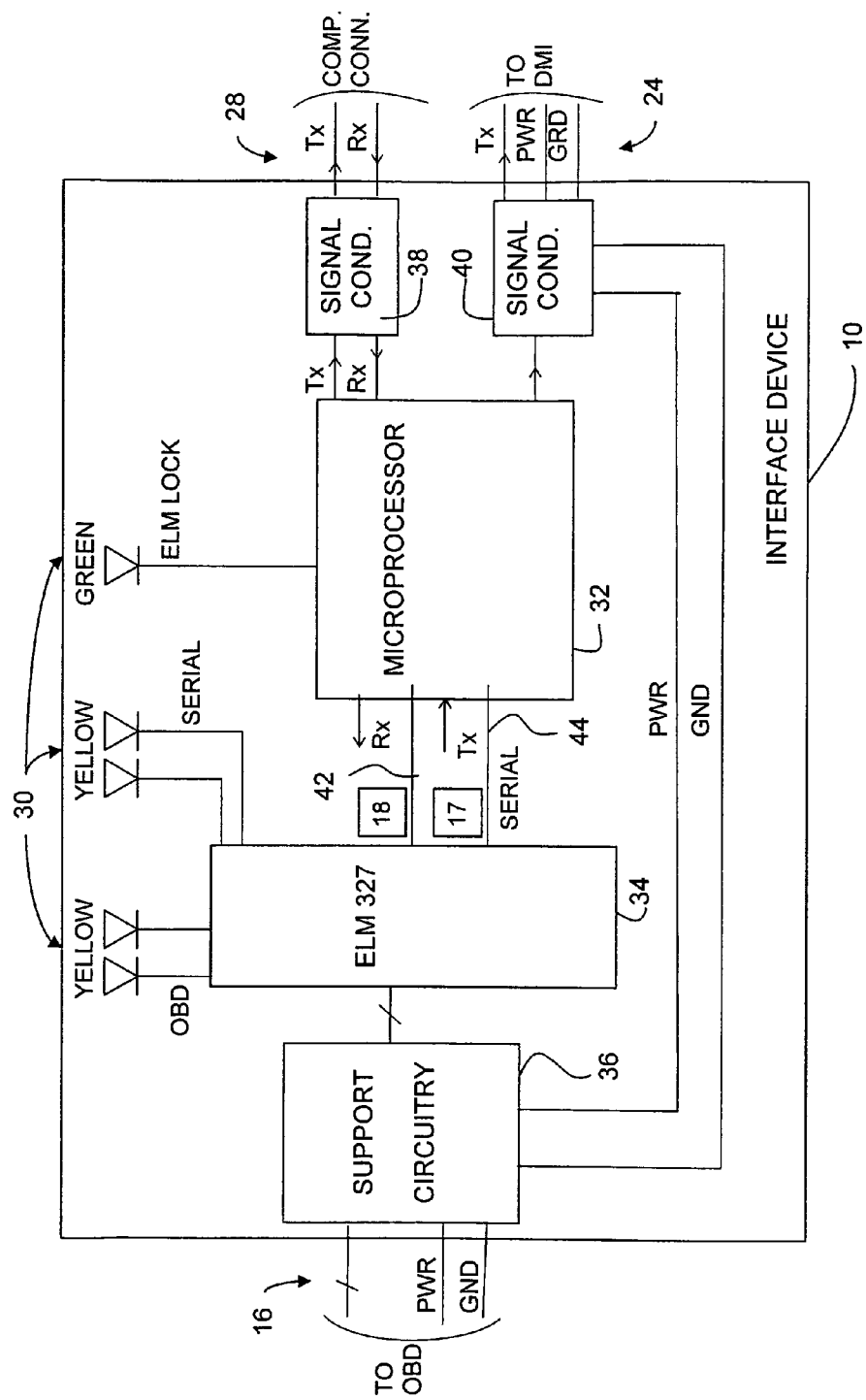
FIG. 3 is a schematic block diagram of one embodiment of the interface device.

Turning now to FIG. 3, further detail of the interface device 10 is shown. The interface device 10 includes a main processor 32 for communicating with the OBD system 12, for interpreting and translating received data, and for communicating such data to the computing device 22 and DMI 14. The processor 32 may be any suitable processing device such as an MC9S12E128 microprocessor available from Motorola™ having flash program memory, random access memory (RAM), one or more timers, one or more universal asynchronous receiver/transmitters (UARTs) and appropriate input/output (I/O) capabilities. In the embodiment shown in FIG. 3, the processor 32 does not directly communicate with the OBD system 12 but instead communicates through OBD protocol interpretation circuitry, e.g. an ELM327 chip 34 and suitable support circuitry 36. It will be appreciated that the processor 32, ELM327 chip 34 and the support circuitry 36 may be implemented together in a single custom circuit and need not be limited to the components shown in FIG. 3. The processor 32 also includes signal conditioning circuitry 38 for the connection 28 and additional signal conditioning circuitry 40 for the DMI connection 24 for providing suitable filtering and amplification such that the resultant output signals can be interpreted by the external components (i.e. for outputting a 'clean' signal). The interface device 10 utilizes the power (PWR) and ground (GND) connections that are also utilized by the support circuitry 36 and passes these signals on to the DMI 14 through the connection 24. This avoids having to tap into the vehicle's power and ground as is required with existing DMI connections.

Figure 4:
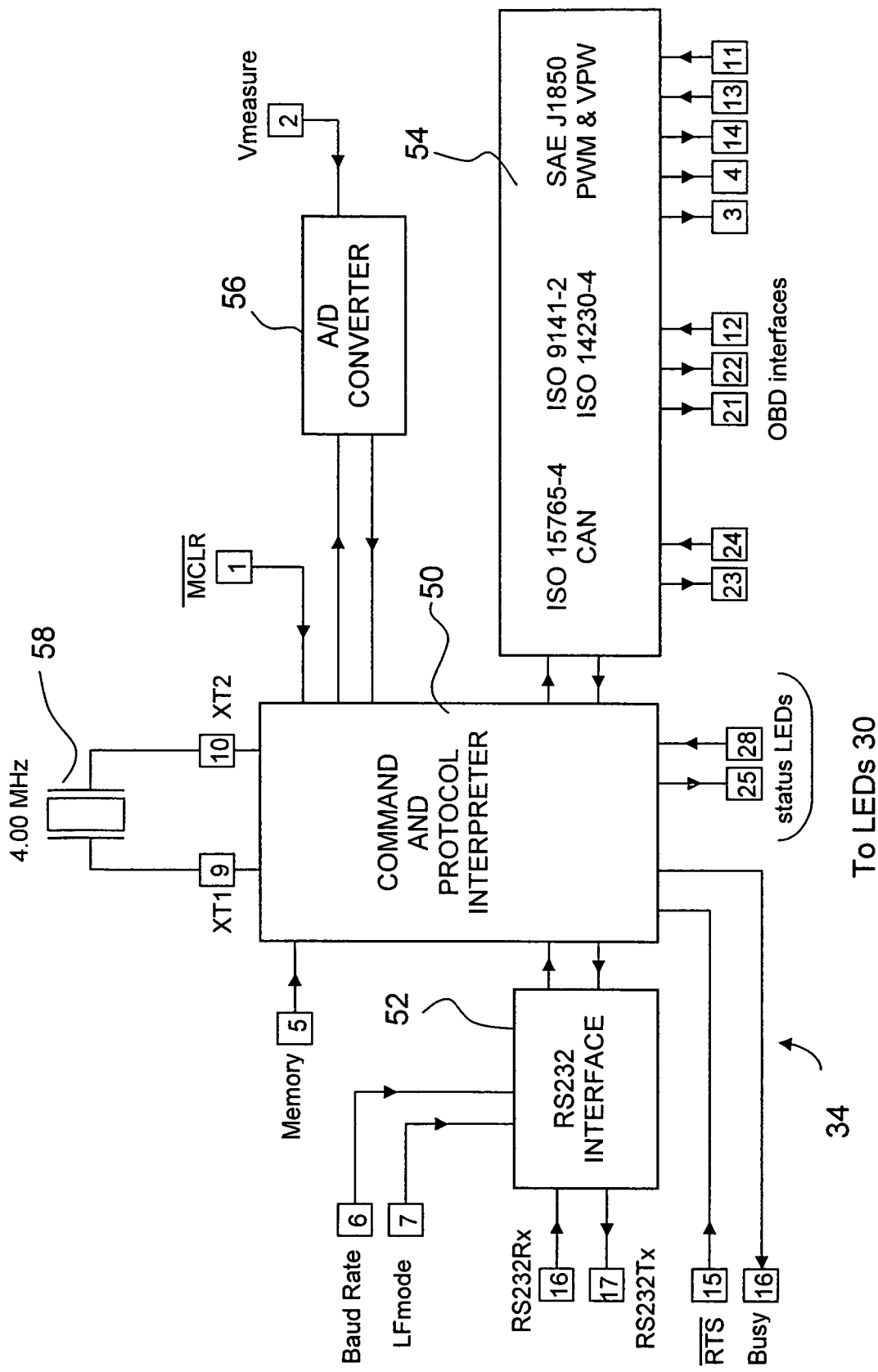
FIG. 4 is a schematic block diagram representing functional blocks of the circuitry implemented by the ELM327 chip shown in FIG. 3.

The chip 34 is a commercially available component that is designed to act as a bridge between OBD systems 12 and standard RS232 ports. In the embodiment shown in FIG. 3, the processor 32 communicates with the ELM327 pins 18 and 17 for receiving and transmitting data respectively. The processor 32 can thus send serial commands to the chip 34 on pin 17 via a transmit signal 44 and receive responses provided by the chip 34 on pin 18 via a receive signal 42. A block diagram illustrating the functional blocks of the chip 34 (or for any comparable OBD protocol interpreter circuitry) is shown in FIG. 4. An ELM327 component is configured to automatically sense and convert data on the OBD system 12 according to nine most common protocols currently in use, namely SAE J1850 PWM (41.6 Kbaud), SAE J1850 VPW (10.4 Kbaud), ISO 9141-2 (5 baud init), ISO 14230-4 KWP (5 baud init), ISO 14230-4 KWP (fast init), ISO 15765-4 CAN (11 bit ID, 500 Kbaud), ISO 15765-4 CAN (29 bit ID, 500 Kbaud), ISO 15765-4 CAN (11 bit ID, 250 Kbaud), and ISO 15765-4 CAN (29 bit ID, 250 Kbaud).

The chip 34 includes a command and protocol interpreter 50 for receiving commands from the processor 32, for preparing OBD data packets according to the corresponding protocol, and for determining the correct protocol used by the vehicle 20 to which the interface device 10 is connected. The interpreter 50 references a clock 58 for timing purposes, and is connected to a voltage measurement pin (pin 2—Vmeasure) through an analog to digital (A/D) converter 56. The voltage measurement is an analog input that is used to measure a 0 to 5V signal that is applied to pin 2. The chip 34 also includes an RS232 interface 52 to enable serial communications with the processor 32. The RS232 interface 52 receives the receive signal 42 from the processor 32 and transmits the transmit signal 44 to the processor 32. The chip 34 also includes an OBD interface module 54 which provides the appropriate signals to the appropriate data pins in the OBD connector 16. The pins noted in FIG. 4 can then be used to connect to the corresponding pins on the OBD connector 18. For example, the CAN protocol pins would be connected to pins 6 and 14 on the OBD connector 16, which are the data pins used for that protocol.

Figure 5:
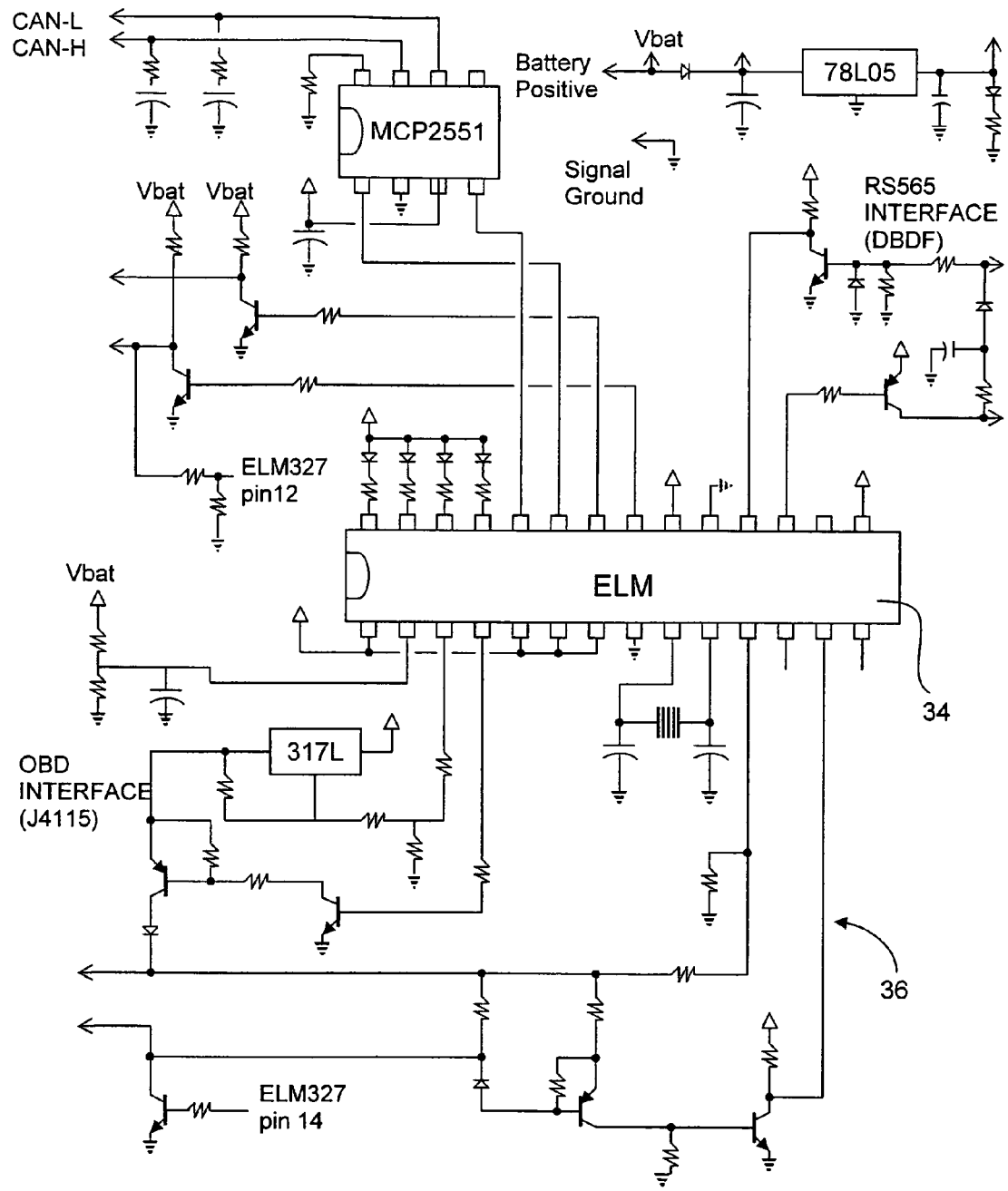
FIG. 5 is a circuit schematic of the support circuitry of FIG. 3.

As noted above, the chip 34 is connected to the OBD system 12 through support circuitry 36. An example of such support circuitry 36 is shown, along with the chip 34, in FIG. 5. In the circuit shown in FIG. 5, circuit power is obtained from the vehicle (via OBD pins 16 and 5) and, after a protecting diode and capacitive filtering, the power is input to a five volt regulator. It will be appreciated that for vehicles that do not have an active pin 5, the alternative power pin, e.g. pin 4 would be used. The regulator powers several points in the circuit as well as the LED output signals for powering four of the LEDs 30. The yellow LEDs 30, which are connected to these signals provide visual confirmation that power is present and when communications are active. The other circuitry shown is used to interface with the various applicable protocols. For example, in the top left of the circuit of FIG. 5, interface circuitry for the CAN protocols is shown, which uses a commercial transceiver chip, e.g. a Microchip MCP2551. It can be seen that the appropriate pins for the appropriate protocols can be selected using the transistors included in the support circuitry 36. In this way, the chip 34 can either select the appropriate protocol based on a command (from processor 32) or can automatically find the protocol that is being used by the vehicle 20 to which the interface device 10 is connected.

In this embodiment, as will be explained below, the processor 32 may instruct the chip 34 to automatically detect the appropriate protocol thus causing the chip 34, when initiated, to automatically cycle through all of the protocols until it finds the one that responds to its commands. It is also noted that the support circuitry 36 in general includes components such as pull-up resistors required by the corresponding standard. As such, it can be appreciated that the support circuitry 36 can be implemented in any way that minimizes stress on the OBD system 12 and complies with the appropriate standards.

As discussed above, the processor 32 communicates with the OBD system 12 via the chip 34 and support circuitry 36. The chip 34 relies on a standard RS232 serial connection to communicate with the processor 32. The chip 34 also requires a proper baud rate (typically either 9600 or 38400 baud), with 8 data bits, no parity bit and 1 stop bit. The responses from the chip 34 are terminated with a single carriage return character and, optionally, a linefeed character. When the chip 34 is properly connected to and powered by the OBD system 12, the four LED outputs (pins 25-28) are powered in sequence as a lamp test, which can be visualized externally on the interface device 10 using the four yellow LEDs 30. The chip 34 then sends a message to the processor 32 that indicates the version of the chip 34 and confirms that the connections are correct. The chip 34 will also provide a prompt character which indicates to the processor 32 that the chip 34 is in an idle state and ready to receive commands.

Once the processor 32 sees the prompt character, it then undergoes a protocol selection procedure. The chip 34 is capable of supporting any of the above-noted protocols and can also be set to automatically detect the protocol being used by the vehicle 20. This can be done by sending the command 'AT SP 0' to the chip 34, where AT indicates that the processor 32 is setting an internal command, SP is the code for 'set protocol' and zero (0) corresponds to the automatic selection mode. When the chip 34 reads this command, it will cycle through all of the protocols as necessary to find the one that responds. Alternatively, the processor 32, if it knows the exact protocol that is to be used, can specify that protocol, however, the automatic selection enables the processor 32 to work with any vehicle 20 supporting any of the protocols without having to know the specific protocol in advance.

Figure 6A:
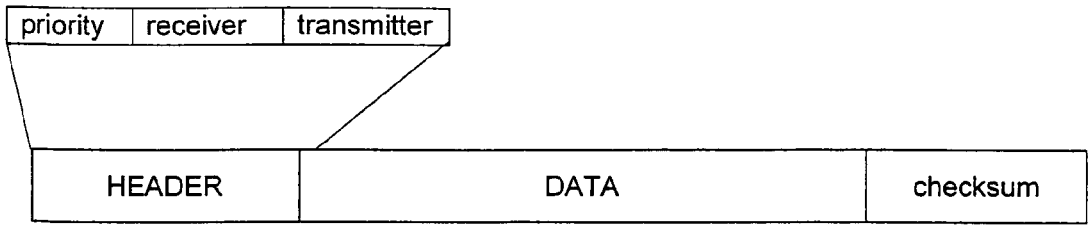
FIG. 6(a) shows an OBD message data packet.

The chip 34 is capable of reformatting and passing on to the vehicle, commands received from the processor 32. In this embodiment, the processor 32 uses the chip 34 to pass along vehicle speed requests. The speed request is made by providing the appropriate hexadecimal message followed by a carriage return character. Since the speed request is intended for the OBD system 12, the processor 32 omits the "AT" which is used for commands internal to the chip 34. Therefore, it can be seen that the chip 34 acts as a bridge for communicating with and obtaining data from the OBD system 12. According to the current ELM327 version, the processor 32 can instruct the chip 34 to pass along a current vehicle speed request by sending the string '010D+carriage return'. The chip 34 then interprets this message and prepares an OBD message 60 such as the message 60 shown in FIG. 6(a).

Figure 6B:
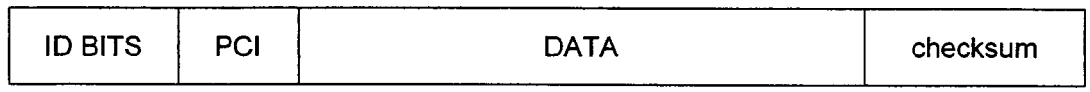
FIG. 6(b) shows a CAN OBD message data packet.

The OBD system 12 is designed to be flexible such that many types of devices can communicate with the vehicle 20. In order for messages to be sent to one another between devices within the OBD system 12, the OBD message 60 contains information describing the type of information being sent, the device that it is being sent to, and, sometimes, which device is actually doing the sending. The OBD system 12 also generally prioritizes the messages it handles. Also, to convey the relative importance, the OBD message 60 is assigned a priority. The message 60 generally includes a header, indicating priority, and identifiers for the receiver and transmitter; the data or payload; and a checksum for detecting errors. FIG. 6(b) shows a modified OBD message 60a that is configured for the CAN protocols. The message 60a includes a number of ID bits, a PCI bit, the data and a checksum. As can be appreciated, the chip 34 (or any alternative circuitry performing the same functions) is configured to be able to prepare and send to the OBD system 12 those types of messages (60, 60a etc.) that are standard and recognized by the OBD system 12. The chip 34 does not normally show the header or check sum values but can be programmed to do so.

Once the chip 34 receives the speed request from the processor 32, it prepares a message 60 such as that shown in FIG. 6 and then sends the message to the OBD system 12. The OBD system 12 then acquires the requested information and replies to the chip 34. The chip 34, after sending the message, listens on the OBD bus (appropriate pins), looking for messages that are directed to it (according to header information). If a message address matches, those received bytes are then sent directly to the RS232 transmit signal 44 via pin 17. Those messages having addresses that do not match are simply ignored by the chip 34. In this embodiment, where vehicle speed is being requested, the reply from the OBD system 12 appears as the string '410D+current speed' where 'current speed' is in hexadecimal notation. This string is thus forwarded directly to the processor 32 which can then convert the speed into an integer and use the information to compute distances etc.

When the processor 32 first establishes communication with the chip 34 and in turn the OBD system 12, the processor 32 powers the green LED 30 to indicate that it has found the correct protocol. When the chip 34 is communicating with the OBD system 12, the yellow 'OBD' LEDs 30 (see FIG. 3) flash, one being a transmit LED and one being a receive LED. Similarly, when the chip 34 is communicating serially, a yellow transmit 'serial' LED 30 or a yellow receive serial LED 30 flashes.

The processor 32, once it has requested a speed reading, and received a response, can repeat this request by simply sending a carriage return to the chip 34, which is interpreted as a request to repeat the previous command. In this way, the processor 32 can repeatedly request the speed request command with minimal processing once the initial communications have been set up. The processor 32 can interpret replies only as quickly as they are received from the chip 34. In order to make accurate measurements, the processor 32 uses its internal timer to keep track of how long each request takes in order to adjust its calculations accordingly as explained in greater detail below.

The processor 32 is the communication interface between the OBD system 12 and the DMI 14. In order to communicate with the DMI 14, the processor 32 translates the data received from the OBD system 12 via the chip 34 into a signal that can be interpreted by the DMI 14 as well as using the appropriate physical connections. As discussed above, typical DMIs 14 that are meant to be used with transmission sensors, read distance by counting a series of pulses, each pulse representing a certain distance.

Figure 7:
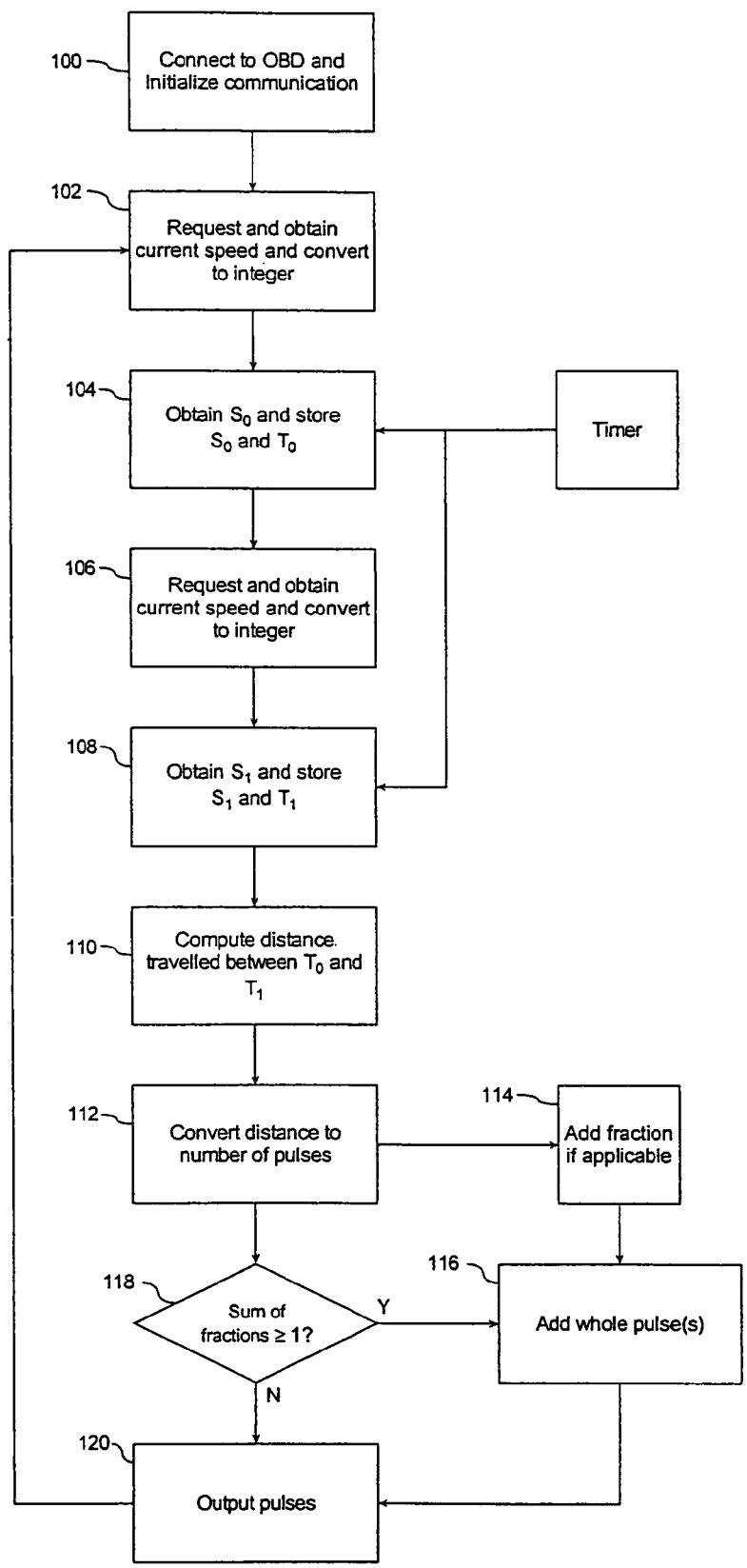
FIG. 7 is a flow chart showing steps performed in obtaining, computing, converting and sending a distance measurement to an existing DMI by communicating with an OBD system.
Figure 8:
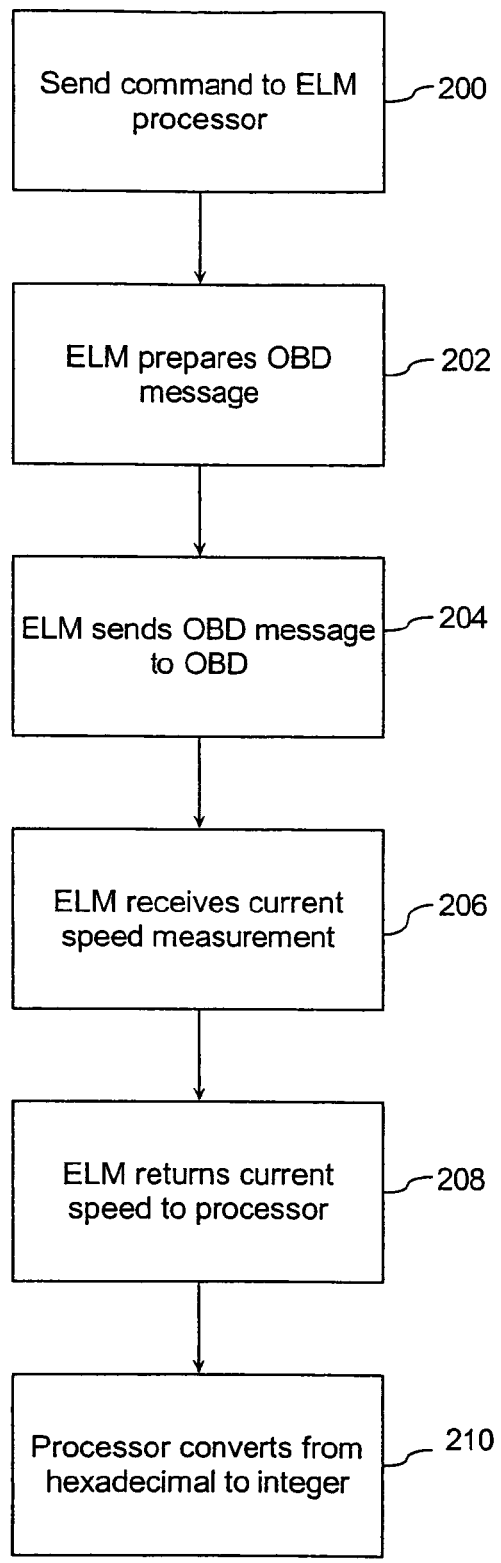
FIG. 8 is a flow chart showing steps for communicating with the OBD to request and receive a vehicle speed measurement.

Turning now to FIG. 7, a process for obtaining, converting and sending data to the DMI 14 is shown. At step 100, the processor 32 establishes a connection with the OBD system 12 using the chip 34 and initializes communication between itself and the chip 34. As discussed above, this may include looking for the prompt and commanding the chip 34 to automatically select the appropriate protocol. At step 102, once initialized, the processor 32 may then request the current speed of the vehicle 20. FIG. 8 summarizes a process for obtaining the current speed when the chip 34 is an ELM327. At step 200 the processor 32 sends the appropriate command to the chip 34, e.g. '010D+carriage return' as discussed above. The chip 34 then prepares the OBD message 60 at step 202 and sends the message 60 to the OBD system 12 at step 204. The chip 34 will then listen for a response and when it recognizes the appropriate address, obtains the current speed measurement in a return message at step 206. The chip 34 then relays this message to the processor 32 at step 208. The processor 32 receives the message in hexadecimal form and converts the data into integer form at step 210 so that it may be used in computing a measurement of distance.

Turning back to FIG. 7, once converted to integer form, the processor 32 obtains a value $S_0$, which represents the integer value of the current speed at step 104. The processor 32 stores $S_0$ in memory and records the time $T_0$ corresponding to the time at which the measurement is obtained, which also takes into account the time taken to complete the request. As such, the processor's internal timer keeps track of when the request is made and when the response is received to make adjustments if necessary. The processor 32 then requests the current speed again at step 106, which repeats the process in FIG. 8 with only a carriage return required in step 200. At step 108, a new speed measurement $S_1$ is stored along with the corresponding time $T_1$. Using the values $S_0$, $S_1$, $T_0$ and $T_1$, the distance travelled between $T_0$ and $T_1$ can be computed at step 110. The distance computed is in integer form and thus is converted to a number of pulses at step 112 to enable the DMI 14 to interpret the measurement. For example, if 10 feet have been travelled between $T_0$ and $T_1$, and each pulse represents 1 foot, then 10 pulses are needed. However, the number of pulses does not often result in a whole number, e.g. 11.4. When a fraction is encountered, the processor 32 adds the fraction (e.g. 0.4) to a value stored in memory at step 114. At step 118, the processor 32 looks at the current 'fraction count' to determine if at least a whole pulse has been accumulated. If so, the processor 32 adds one or more whole pulses at step 116 based on its current count and then the total number of pulses (plus an accumulation of the residual fractions from current and previous measurements) is output at step 120. In this way, the total number of pulses sent to the DMI 14 is significantly more accurate, which in turn results in a more accurate measurement of distance. If the pulse fractions were simply discarded, some distance would be lost over time. Alternatively, the processor 32 could use an intelligent 'rounding' system that may over time average out. However, the accumulation and use of the fractions as they equal whole pulses is preferred. As can be seen in FIG. 7, the process is repeated continuously while the interface device 10 is connected to the OBD system 12.

Figure 14:
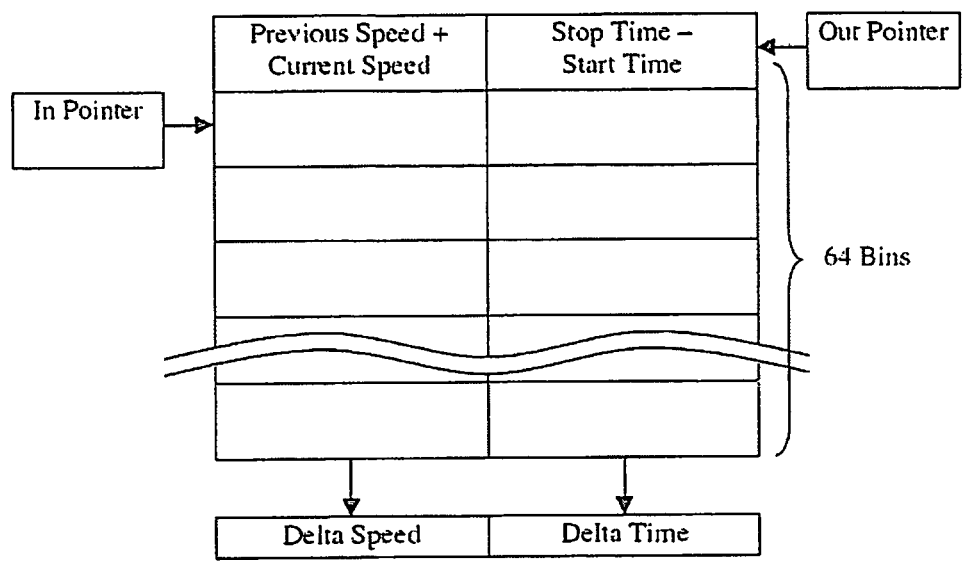
FIG. 14 is a block diagram showing a first-in-first-out (FIFO) data structure.

One way to compute the distance and translate the data into pulses, e.g. as shown generally in steps 110 to 120 will now be described, making reference to FIG. 14. Initially, an In Pointer and Out Pointer for a first-in-first-out (FIFO) data structure are both set to zero. When the chip 34 synchronizes with the OBD system 12 and delivers the first speed reading in step 102, an input thread adds the Previous Speed to the Current Speed and puts the result in the FIFO according to the In Pointer. The input thread then also subtracts the Start Time from the Stop Time and puts that result into the FIFO. The FIFO pointer is then incremented by one Bin as shown in FIG. 14, and then the FIFO is reviewed to determine if the In Pointer has gone beyond the end of the FIFO. If so, the In Pointer is set to zero.

Then the output thread gets a chance to run, it compares the In Pointer to the Out Pointer. If they are the same, there is no data in the FIFO and the output thread releases use of the processor 32. If the two pointers are different, the output thread then copies the Speed value (e.g. $S_1$) to the Delta Speed variable and the Time value (e.g. $T_1$) to the Delta Time variable. The Out Pointer is then advanced to the next Bin. The output thread then checks to see if the Out Pointer has gone beyond the end of the FIFO. If so, the In Pointer is set to zero.

The Accumulated Distance can then be computed as follows:

$$AccumDistance = AccumDistance + (MetConvFactor * AvgSpeed * DeltaTime)$$

AvgSpeed is the sum of the Previous Speed and Current Speed divided by two. The value MetConvFactor is a precalculated value, which can be computed as: 1 km/hr=100,000 cm/km*1/2.54 in/cm*1/12 ft/in*1/3600 hr/sec=0.911344415 ft/sec*hr/km. In this way, 0.911344415 ft/sec*hr/km*AvgSpeed (km/hr)*Delta Time (sec) produces a Distance Travelled in feet. Accordingly, Accumulated Distance then equals Accumulated Distance+Distance Travelled. The Delta Time may vary for each chip 34/OBD system 12 transaction and from vehicle to vehicle.

The Accumulated Distance is then split into an Integer Part and a Fractional Part. As such, AccumDistance=AccumDistance−Integer Part. The Fractional Part is left over and retained in the Accumulated Distance to be used in the next computation.

The value for the Integer Part is what is sent to the DMI 14 where the pulse frequency is calculated so that the pulses are delivered in an evenly spread out manner within the time interval in the Delta Time variable. The frequency is preferably made to be a little faster so that the Output side is a bit faster than the Input side so that the FIFO In and Out pointers stay fairly close together. A diagnostic check can be used to determine whether or not the pointers are fairly close, such as 1 Bin apart.

Once the process in FIG. 7 has started, it continues as fast as the chip 34/OBD system 12 can deliver speed readings. If any zero readings are encountered, they can still be added to the FIFO with the corresponding time. Since multiplying by zero always equals zero, the Accumulated Distance would remain the same with any fractional value staying in the accumulator and no pulses would be output to the DMI 14 for that period. Preferably, the accumulator can be cleared so that no fractional pulses are left after a run. However, even if the accumulator is not cleared, the small error in distance caused by the addition of that fraction in the next run would be negligible and thus not adversely affect the measurement.

While the interface device 10 is converting and transmitting pulses to the DMI 14, it may also use the measurements to provide a data signal to the external computing device 22. This would enable a user to set up, e.g. a laptop, to make additional measurements and to record data in logs etc. for later analysis. The connection 28 also enables an external computer 22 to upload new software to the processor 32 or to upgrade, program, re-flash or any other communication with the processor 32. In this way, the hardware does not necessarily need to be accessed to repair, reprogram or upgrade the firmware of the interface device 10. Moreover, this enables the interface device 10 to be used for other data acquisition tasks, in addition to being an interface for a DMI 14. As such, the processor 32 could also be programmed to request and obtain other data (i.e. in addition to vehicle speed) to add further functionality to the interface device 10. This would allow the user to use the device 10 for other diagnostic or measurement taking tasks using any compatible computing device 22.

The interface device 10 may also be equipped with a current sensing circuit (not shown) to control the power to the device 10 obtained from the OBD system 12 (see FIG. 3). For example, when the DMI 14 is turned off in the vehicle 20, (e.g. a slide switch (not shown) on the housing for the device 10), the current sensing circuit senses the power outage to the DMI 14 and, when detected, causes the current sensing circuit to turn off the power to the interface device 10 thus eliminating power drain from the car battery (which ultimately powers the OBD system 12). It can be seen therefore that such current sensing circuitry can be used to minimize disassembly since cutting the power to the interface device 10 enables the device 10 to remain plugged in without adversely draining power in the vehicle 20. It can also be seen that other circuit protection can be implemented with the interface device 10 to provide optimal performance.

It will be appreciated that the functions performed by the chip 34 can be implemented using custom circuitry and need not be limited to using an ELM327 component. These functions may be programmed into the processor 32 with the appropriate support circuitry 36 connected directly to the processor 32. It will also be appreciated that all connections and connectors shown are for illustrative purposes only and can be exchanged with any connectors that are suitable for interfacing with the respective components. As such, should the connections to the OBD system 12 or the DMI 14 change, the interface device 10 can be adapted to accommodate such changes. It will also be appreciated that the interface device 10 can be equipped with self-test and other diagnostic features for checking the integrity of the connections. Moreover, the connections 24 or 28 can also be used to calibrate the processor 32 according to the specific DMI 14 that is being interfaced (e.g. feet per pulse).

It can therefore be seen that the interface device 10 can be used to obtain and relay to the DMI 14, data obtained from the OBD system 12. In this way, the cost and inherent drawbacks of tapping into the VSS of the vehicle 20 can be avoided. The processor 32 provides a translation between the data obtained from the OBD system 12 and what is required by the DMI 14 to function as it normally would. The interface device 10 is portable and can be easily installed in any OBD-compatible vehicle by simply plugging into existing ports. Users are also able to use existing DMI 14 units already in use because of the translation capabilities of the interface device 10.

Figure 15:
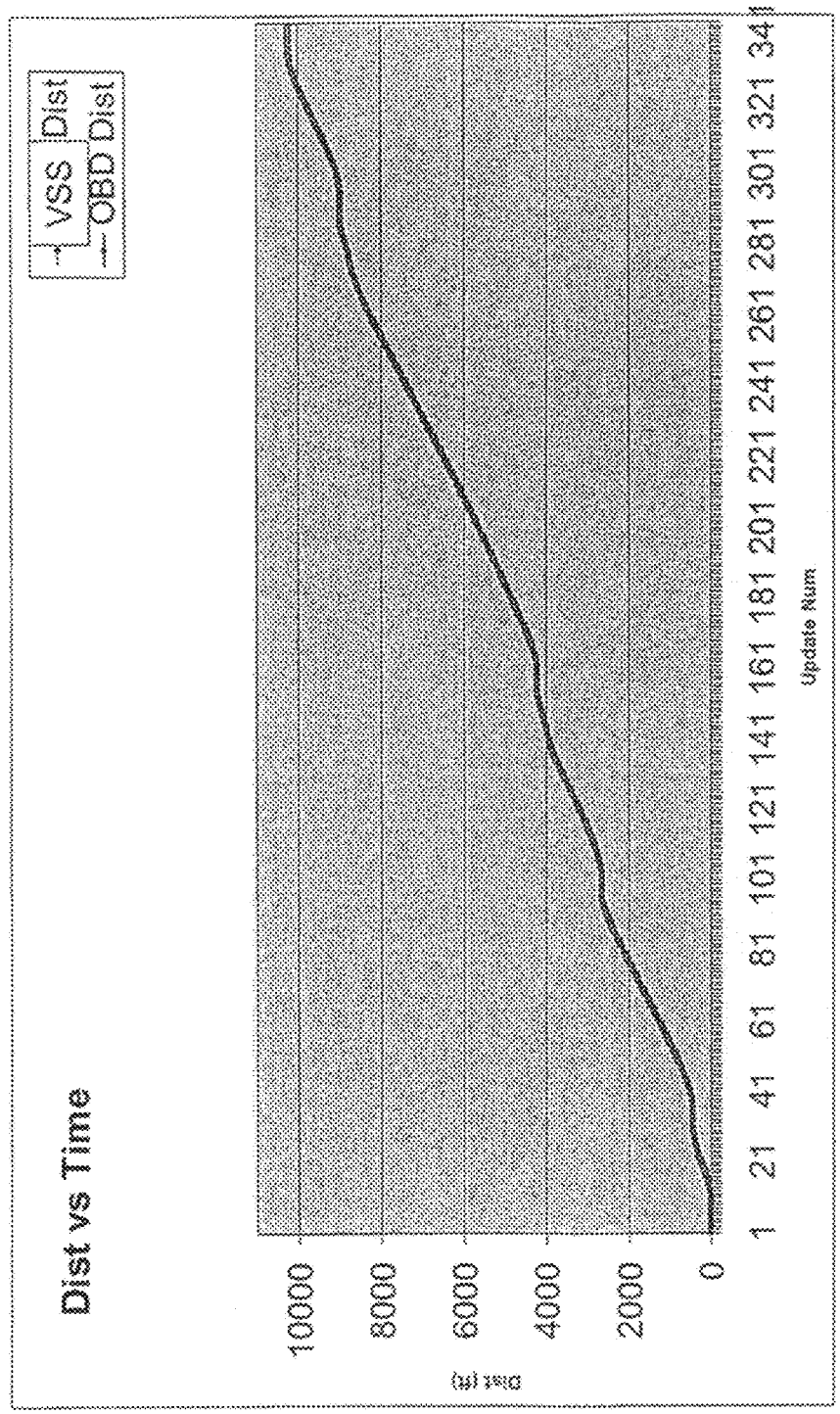
FIG. 15 is a chart illustrating sample distance versus time results obtained using the system shown in FIG. 1 compared to data obtained from a VSS system.
Figure 16:
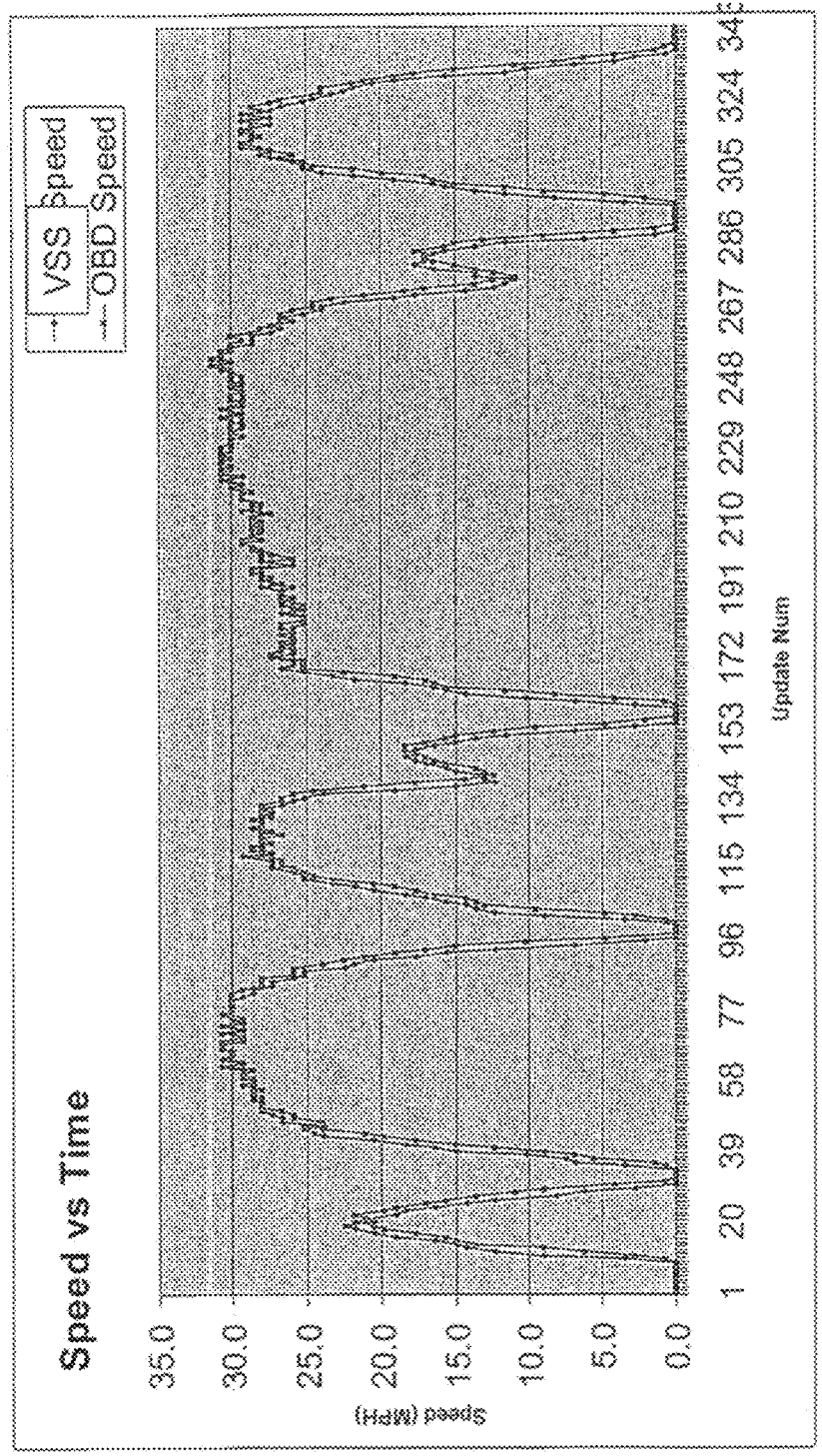
FIG. 16 is a chart illustrating sample speed versus time results obtained using the system shown in FIG. 1 compared to data obtained from a VSS system.

FIGS. 15 and 16 illustrate sample test results comparing measurements taken using the interface device 10 and measurements taken from a traditional VSS configuration. FIG. 15 shows a distance versus time graph and FIG. 16 shows a speed versus time graph. It can be seen from these sample results that the information obtained by the interface device 10 from the OBD system 12 is comparable to that which can be obtained using a VSS configuration without experiencing the drawbacks discussed above.

Figure 9:
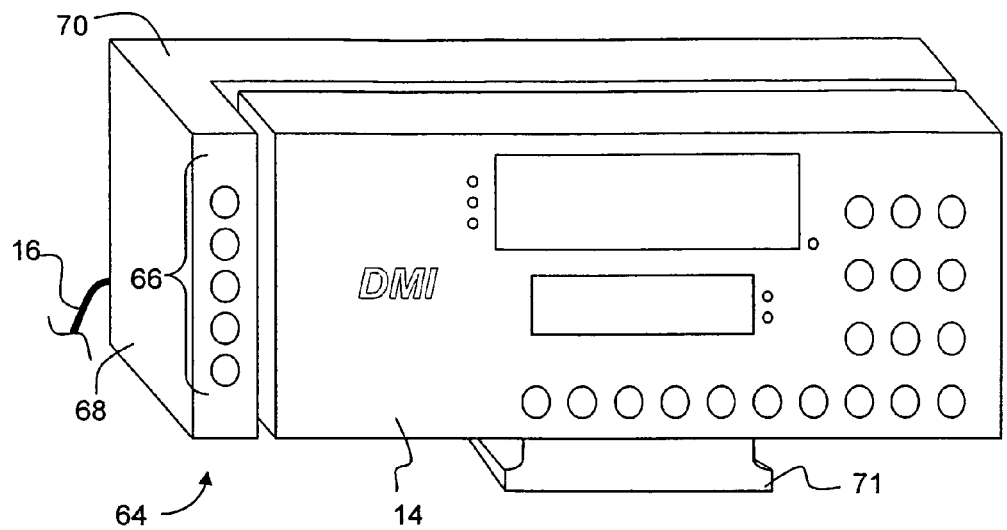
FIG. 9 is a perspective view of another embodiment of the interface device having a housing configured to provide a docking station for the DMI.
Figure 10:
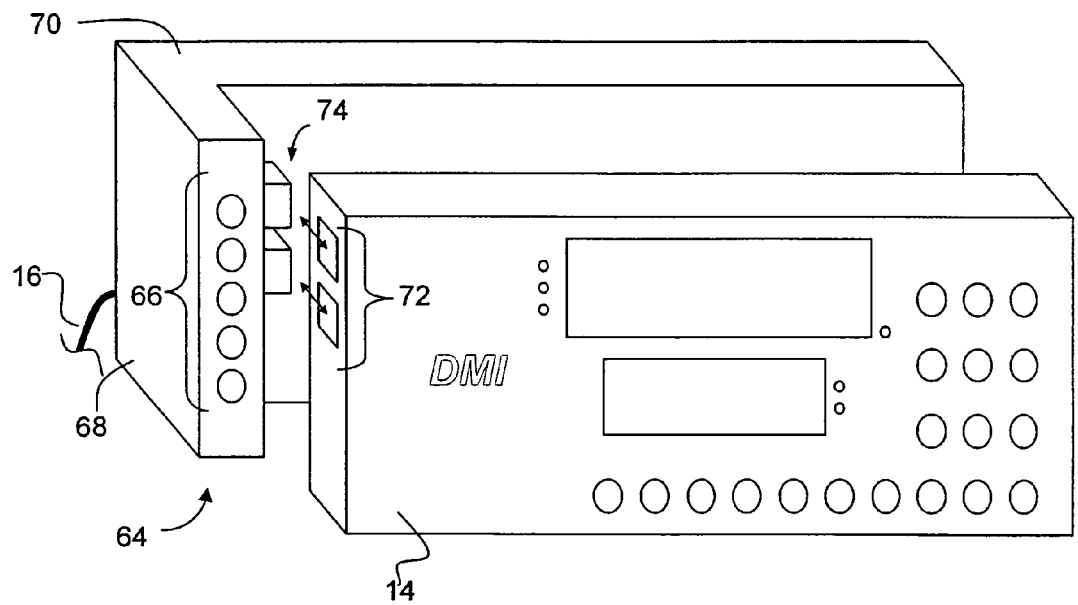
FIG. 10 is a perspective view showing separation of the DMI and interface device shown in FIG. 9.
Figure 11:
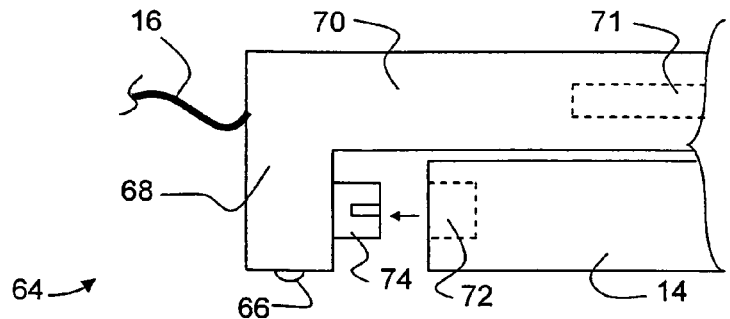
FIG. 11 is a partial plan view showing an operation for mating the DMI with the housing shown in FIGS. 9 and 10.

In another embodiment, shown in FIGS. 9 to 11, the interface device 10 can be housed in an L-shaped docking station type housing 64. The housing 64 enables the user to plug the DMI 14 directly into the interface device 10 to create a single combined unit that can be mounted on the dash of the vehicle 20. This eliminates the need for a cable running between the interface device 10 and the DMI 14. As can be seen in FIG. 10, connectors 74 on a docking arm 68 of the housing 64 are aligned to mate with data sockets 72 provided by the DMI 14 such that the DMI 14 can be slid into place as illustrated in FIG. 11. The connection 16 would run from the housing 64 to the OBD connector 18 as described above, and LEDs 66 would be provided at the same eye level as the DMI's display and input features as shown in FIG. 9. The circuitry illustrated in FIG. 3 is housed in a backing portion 70 of the housing 64 which runs along the length of the DMI 14 to give the appearance of a continuous single unit. Since the housing 64 is intended to hold the DMI 14, a mounting mechanism 71 such as platform (with suitable adhesive etc.) as shown in FIG. 9 can be used.

It can be seen that the embodiment of FIGS. 9 to 11 provides a convenient docking station for the DMI 14 thus eliminating a cable 24, places the LEDs 66 at the same eye level as the DMI 14, improves safety (reduction in cords) and minimizes cable clutter in the driver's operating zone.

Figure 12:
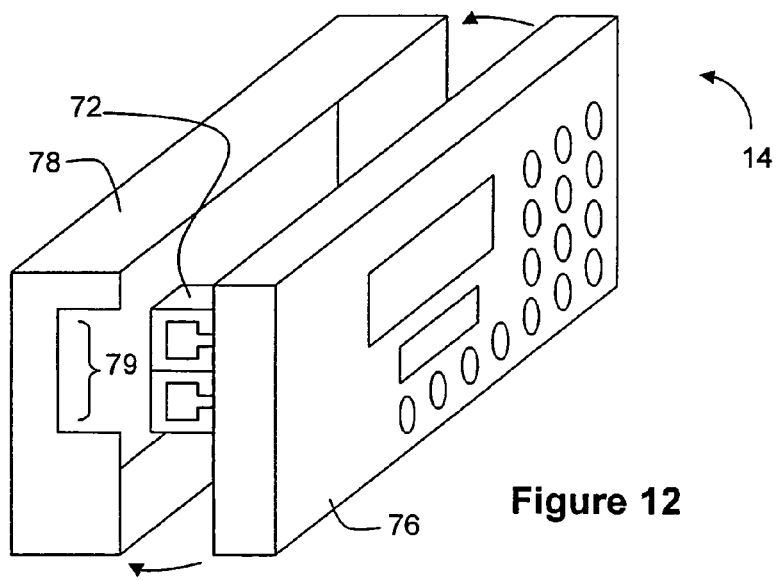
FIG. 12 is a perspective view of front and back plates for a DMI housing.
Figure 13:
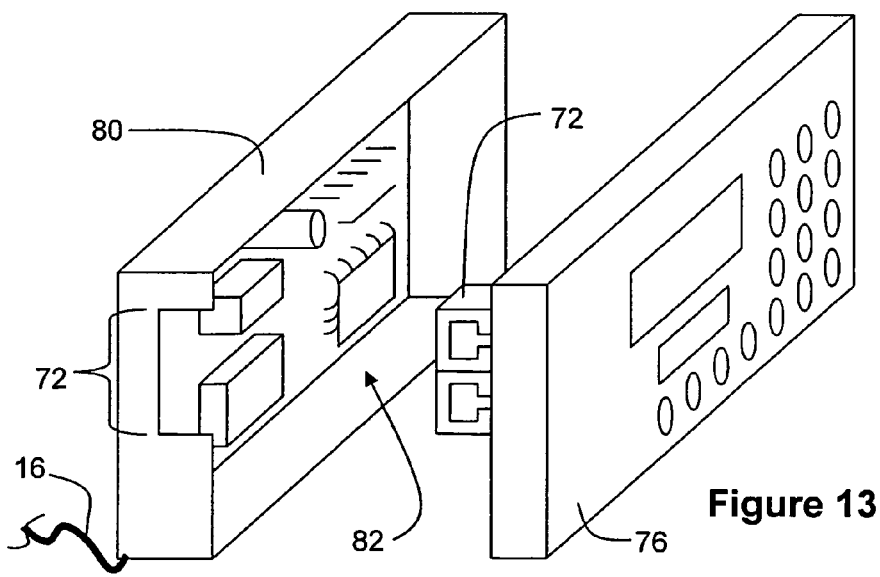
FIG. 13 is a perspective view of a retrofitted back plate comprising the circuitry for the interface device in yet another embodiment.

Yet another embodiment shown in FIGS. 12 to 13 further integrates the interface device 10 with the existing DMI housing. As shown in FIG. 12, the existing DMI 14 includes a front plate 76 and a back plate 78 that snap together, with the back plate 78 including a passage 79 for the sockets 72. As can be seen in FIG. 13, this embodiment provides a retrofitted backing 80 that is sized and configured to mate with the front plate 76 of the existing DMI 14. This does not affect the operation of the DMI 14 but does enable the circuitry 82 for the interface device 10 to be hidden within the backing 80. Similar to the embodiment in FIG. 9, no cable from the interface device 10 to the DMI 14 is needed. In this embodiment, the circuitry 82 connects directly to the sockets 72 but internally within the DMI 14. The retrofitted backing 80 can be used by the existing manufacturer to provide an enhanced DMI 14 that can interface with the OBD system 12 without having to modify the existing and familiar circuitry, functionality and displays etc.

It will be appreciated that in any of the embodiments described above, the interface device 10 may include an external display (not shown) such as an LCD screen for displaying the data acquired from the OBD system 12 and/or to provide a further interface for the user to control the device 10. Similarly, the interface device 10 may also include additional memory for storing data files either to be used in a DMI 14 at a later time or to be uploaded to a PC etc. and may have standard data ports such as USB, Ethernet etc. It can thus be seen that the interface device 10 can be utilized to provide convenient information to the user in a portable and easy to install manner.

Figure 17:
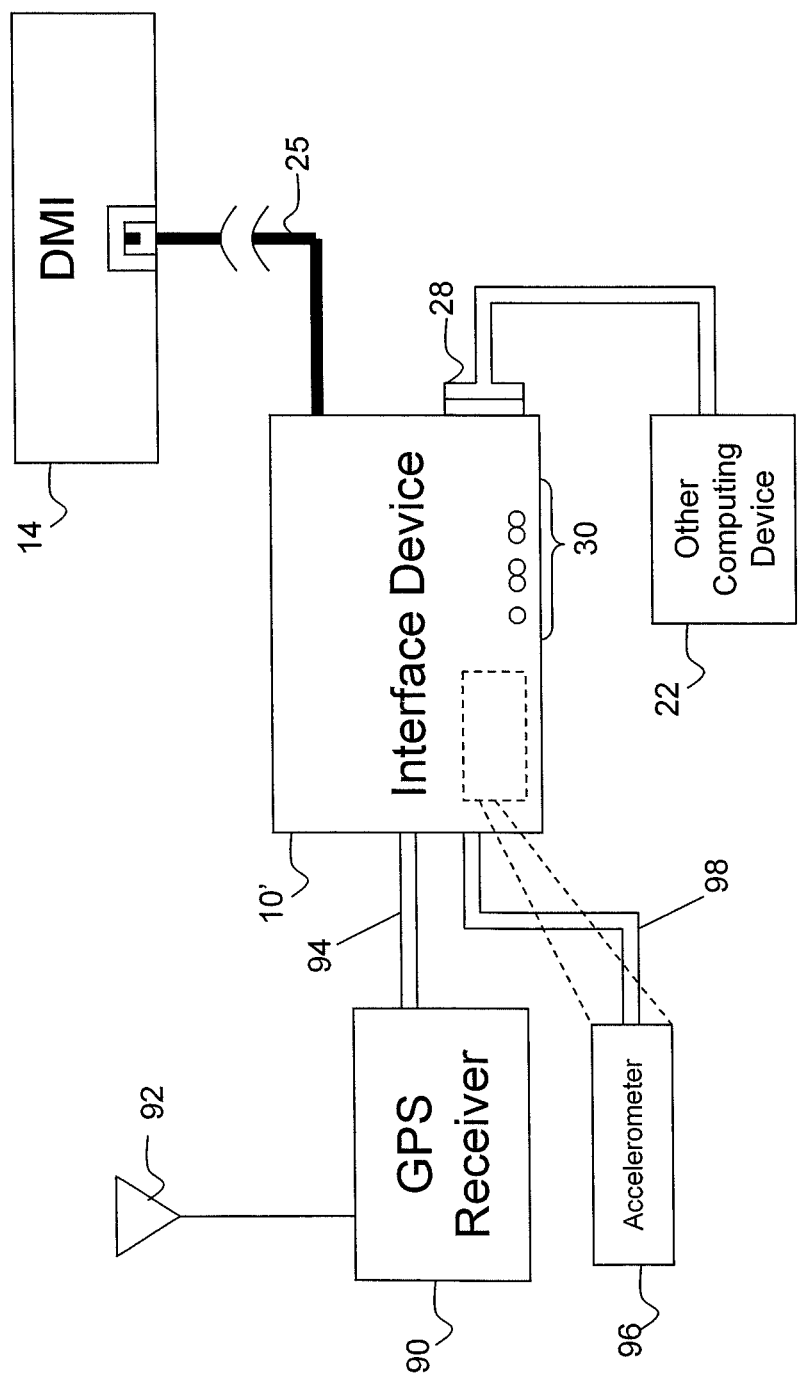
FIG. 17 is a block diagram illustrating another embodiment of the system shown in FIG. 1.

As discussed above, the interface device 10' can also be configured to obtain information such as speed measurements, that enable distance to be computed for the DMI 14, from other devices. One example is by obtaining information such as a speed measurement from a global positioning system (GPS) receiver 90 as shown in FIG. 17. In the configuration shown in FIG. 17, numeral 10' is used to indicate an adaptation of the interface device 10 described above. The interface device 10' provides the same connections 25 and 28 to the DMI 14 and, if applicable, to the other computing device 22 respectively as discussed above. The interface device 10' interfaces with the GPS receiver 90 via a connection 94 and the GPS receiver 90 communicates with a GPS system (not shown) via an antenna 92. Also shown in FIG. 17 is an accelerometer 96 which, as will be explained below, can be used to interpolate data when a GPS signal is temporarily disrupted and for other fine tuning as need. It can be seen that the accelerometer 96 can be an external device connected to the interface device 10' by a connection 98, or can be incorporated into the circuitry of interface device 10'. Although FIG. 17 shows the connection 94 in place of the OBD connection 16, it will be appreciated that the interface device 10' can also be configured to accommodate both the OBD connection 16 and the connection 94 to provide a hybrid solution enabling speed to be ascertained using different mediums.

The interface device 10' shown in FIG. 17 may thus use the connection 94 to communicate with the GPS receiver 90 to receive speed measurements similar to how the OBD system 12 is used to request current speed as discussed above. The interface device 10' may utilize the same logic as the embodiment described above to convert the speed measurements into a distance measurement and thus create a sequence of pulses that indicates to the DMI 14, the distance that has been travelled. It will be appreciated that the communication protocol for interfacing with the GPS receiver 90 may vary according to different manufacturers and models and the interface device 10' can be calibrated accordingly, e.g. in the same way firmware updates can be loaded as mentioned above. The connection 94 can be created according to the outputs provided by the GPS receiver 90. For example, if the GPS receiver 90 provides bare wires, the connection 94 can be made by attaching a male connector and providing a female socket on the interface device 10' (not shown). In the case of a hybrid system, the interface device 10' can also incorporate a switch or firmware to determine if GPS data is to be processed, or OBD data. As discussed above, the interface device 10 may obtain power from the OBD system 12. If operating using GPS only, i.e. without an OBD connection 16, the interface device 10 would require an alternative power supply, e.g. a battery or other external connection. If the GPS receiver 90 can provide a power output, such output can also be used. In the hybrid solution, the OBD connection 16 can provide the power at all times with the GPS connection 94 unplugged when using OBD data. It can therefore be seen that various configurations incorporating OBD data, GPS data or both can be implemented with the appropriate hardware and firmware modifications made where appropriate. It will be appreciated that the GPS connection 94 may use any suitable communication protocol as dictated by the configuration of the GPS receiver 90, e.g. USB or other serial interfaces.

It may be noted that embodiments utilizing the GPS receiver 90 for determining speed of the vehicle can be configured to eliminate the need for the additional circuitry for communicating with the OBD system 12 such as the ELM chip 34 discussed above. This can be particularly advantageous where GPS receiver 90 is already included in the vehicle and thus additional hardware is not needed to use GPS data and hardware can be eliminated at the same time. It can be appreciated that the logic employed by the interface device 10 for obtaining a speed measurement, processing the speed measurement, and outputting a series of pulses to the DMI 14 as discussed above, would not require significant modifications when utilizing GPS data since the operations are performed on the basis of speed measurement being obtained.

The accelerometer 96 can be used to fine tune the GPS data or to fill in missing data during GPS signal losses, which can occur. For example, the microprocessor 32 or post processing software used after a test, can be programmed to "back-fill" any missing data points that occur during such a signal loss by using measurements from the accelerometer 96 as obtained and if necessary recorded during the time in which the loss occurred.

It can therefore be seen that the system 10 can be configured to obtain any information that permits the computation of a series of pulses for a DMI 14, from any available source in the vehicle and should not be limited to the examples provided above.

Although the invention has been described with reference to certain specific embodiments, various modifications thereof will be apparent to those skilled in the art without departing from the spirit and scope of the invention.

The invention claimed is:

1. A method comprising:
   providing an interface device configured to translate data output by a first processor in an in-vehicle system operable to output data associated with a moving vehicle, into an input that is recognized by a second processor in an in-vehicle commercially available distance measurement instrument (DMI) to enable said DMI to operate while said vehicle is moving, without modifying how said DMI normally operates, said DMI comprising an interface for coupling the interface device thereto, said second processor, and a display for displaying real-time distance measurements;
   communicating with the in-vehicle system to obtain data from which a distance that the vehicle has travelled can be ascertained, the data being generated by the first processor as the vehicle moves;
   using said data to determine said distance; converting said distance to a series of pulses that resemble pulses generated by a vehicle speed sensor (VSS) in said vehicle to generate the recognized input required by the DMI for said DMI to operate as said DMI normally would, said DMI otherwise requiring an installation kit to access a signal provided by said VSS, said DMI normally operable to count said pulses generated by said VSS to determine said distance; and
   providing said series of pulses as said recognized input to said second processor, via an existing data connection with said interface provided by said DMI in real-time during use of said DMI while said vehicle is moving to enable said DMI to display said distance while said vehicle is moving.

2. The method according to claim 1 wherein said in-vehicle system comprises an on board diagnostic (OBD) system.

3. The method according to claim 2 wherein said communicating comprises sending a plurality of vehicle speed requests to said OBD system to obtain a plurality of vehicle speed measurements; and wherein said distance is determined during a time interval using said plurality of vehicle speed measurements and time stamps associated therewith.

4. The method according to claim 3 further comprising: accumulating fractional pulses over time and adding whole pulses to said series of pulses.

5. The method according to claim 2 wherein communicating with said OBD system comprises using a third processor to obtain said data by instructing an ELM chip to:
   generate OBD messages;
   send said OBD messages to said OBD system;
   receive current speed measurements; and
   return said current speed measurements to said third processor wherein said third processor converts said data to an integer format and processes said data to obtain said distance.

6. The method according to claim 1 further comprising: providing a set of visible light-emitting diodes (LEDs) and using said LEDs to indicate communication status information.

7. The method according to claim 1 further comprising: providing another interface for another computing device to enable any one or more of: said other interface device to store said data for later use; and said other computing device to program said other interface device.

8. The method according to claim 1 wherein said in-vehicle system comprises a global positioning system (GPS) receiver.

9. The method according to claim 8 further comprising obtaining additional data from an accelerometer and using said additional data to interpolate said distance for time periods where said data cannot be obtained from said GPS receiver.

10. A non-transitory computer readable medium comprising computer executable instructions for operating an interface device configured to translate data output by a first processor in an in-vehicle system operable to output data associated with a moving vehicle, into an input that is recognized by a second processor in an in-vehicle commercially available distance measurement instrument (DMI) to enable said DMI to operate while said vehicle is moving, without modifying how said DMI normally operates, said DMI comprising an interface for coupling the interface device thereto, said second processor, and a display for displaying real-time distance measurements, the computer executable instructions comprising instructions for:
   communicating with the in-vehicle system to obtain data from which a distance that the vehicle has travelled can be ascertained, the data being generated by the first processor as the vehicle moves;
   using said data to determine said distance;
   converting said distance to a series of pulses that resemble pulses generated by a vehicle speed sensor (VSS) in said vehicle to generate the recognized input required by the DMI for said DMI to operate as said DMI normally would, said DMI otherwise requiring an installation kit to access a signal provided by said VSS, said DMI normally operable to count said pulses generated by said VSS to determine said distance; and
   providing said series of pulses as said recognized input to said second processor, via an existing data connection with said interface provided by said DMI in real-time during use of said DMI while said vehicle is moving to enable said DMI to display said distance while said vehicle is moving.

11. An interface device configured to translate data output by a first processor in an in-vehicle system operable to output data associated with a moving vehicle, into an input that is recognized by a second processor in an in-vehicle commercially available distance measurement instrument (DMI) to enable said DMI to operate while said vehicle is moving, without modifying how said DMI normally operates, said DMI comprising an interface for coupling the interface device thereto, said second processor, and a display for displaying real-time distance measurements, said interface device comprising:
- a first connection compatible with a connector for said in-vehicle system;
- a second connection compatible with said DMI; and
- a processor communicable with said first and second connections, wherein said processor is configured to:
  - communicate with said in-vehicle system to obtain data from which a distance that the vehicle has travelled can be ascertained, the data being generated by the first processor as the vehicle moves;
  - use said data to determine said distance;
  - convert said distance to a series of pulses that resemble pulses generated by a vehicle speed sensor (VSS) in said vehicle to generate the recognized input required by the DMI for said DMI to operate as said DMI normally would, said DMI otherwise requiring an installation kit to access a signal provided by said VSS, said DMI normally operable to count said pulses generated by said VSS to determine said distance; and
  - provide said series of pulses as said recognized input to said second processor, via an existing data connection with said interface provided by said DMI in real-time during use of said DMI while said vehicle is moving to enable said DMI to display said distance while said vehicle is moving.

12. The interface device according to claim 11 wherein said in-vehicle system comprises an on board diagnostic (OBD) system and said first connection is compatible with an OBD connector.

13. The interface device according to claim 12 wherein said interface device processor is further configured to send a plurality of vehicle speed requests to said OBD system to obtain a plurality of vehicle speed measurements; and determine said distance during a time interval using said plurality of vehicle speed measurements and time stamps associated therewith.

14. The interface device according to claim 13 wherein said interface device processor is further configured to: accumulate fractional pulses over time and add whole pulses to said series of pulses.

15. The interface device according to claim 12 wherein said interface device processor is further configured to: instruct an ELM chip in send said interface device to generate OBD messages to obtain said data, instruct said ELM chip to send said OBD messages to said OBD system, instruct said ELM chip to receive current speed measurements and instruct said ELM chip to return said current speed measurements to said interface device processor wherein said interface device processor is further configured to convert said data to an integer format and process said data in said integer format to obtain said distance.

16. The interface device according to claim 11 further comprising a set of visible light-emitting diodes (LEDs) wherein said interface device processor is further configured to use said LEDs to indicate communication status information.

17. The interface device according to claim 11 further comprising another interface to another computing device to enable any one or more of: said other interface device to store said data for later use; and said other computing device to program said other interface device.

18. The interface device according to claim 11 wherein said in-vehicle system comprises a global positioning system (GPS) receiver and said second connection is adapted to communicate with said GPS receiver.

19. The interface device according to claim 18 wherein said interface device processor is further configured to obtain additional data from an accelerometer and use said additional data to interpolate said distance for time periods where said data cannot be obtained from said GPS receiver.

20. The interface device according to claim 11 comprising a housing configured to connect directly to the DMI such that the DMI is adjacent to said housing.

21. The interface device according to claim 20 wherein said housing comprises a docking station to connect said DMI to said interface device.

22. The interface device according to claim 20 wherein said housing comprises a backing portion for said DMI such that said interface device and said DMI appear as a single unit when connected.

* * * * *